United States Patent
Ryu et al.

(10) Patent No.: US 10,615,383 B2
(45) Date of Patent: Apr. 7, 2020

(54) BATTERY MODULE, AND BATTERY PACK AND VEHICLE COMPRISING SAME

(71) Applicant: LG CHEM, LTD., Seoul (KR)

(72) Inventors: Jae-Uk Ryu, Daejeon (KR); Jeong-O Mun, Daejeon (KR); Byoung-Cheon Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/772,297

(22) PCT Filed: Mar. 22, 2017

(86) PCT No.: PCT/KR2017/003081
§ 371 (c)(1),
(2) Date: Apr. 30, 2018

(87) PCT Pub. No.: WO2017/217643
PCT Pub. Date: Dec. 21, 2017

(65) Prior Publication Data
US 2018/0323412 A1    Nov. 8, 2018

(30) Foreign Application Priority Data
Jun. 16, 2016  (KR) ........................ 10-2016-0075277

(51) Int. Cl.
*H01M 2/10*      (2006.01)
*B60L 50/60*     (2019.01)
(Continued)

(52) U.S. Cl.
CPC ............ *H01M 2/105* (2013.01); *B60L 50/50* (2019.02); *B60L 50/64* (2019.02); *B60L 50/66* (2019.02);
(Continued)

(58) Field of Classification Search
None
See application file for complete search history.

(56) References Cited

U.S. PATENT DOCUMENTS

| 8,481,193 B2 | 7/2013 | Yoon |
| 9,663,188 B2 | 5/2017 | Kwag et al. |

(Continued)

FOREIGN PATENT DOCUMENTS

| EP | 0964470 A1 | 12/1999 |
| EP | 2343752 A2 | 7/2011 |

(Continued)

OTHER PUBLICATIONS

Maglite, "Accu Maglite 3500mAh 6V MagCharger," May 17, 2014, Retrieved from the Internet: URL:https://www.batterijenland.nl/accu-maglite-3500mah-nimh-magcharger, Feb. 19, 2019, pp. 1-4, XP055558983.

(Continued)

*Primary Examiner* — Daniel S Gatewood
(74) *Attorney, Agent, or Firm* — Birch, Stewart, Kolasch & Birch, LLP

(57) ABSTRACT

Disclosed is a battery module, and a battery pack and a vehicle including the battery module. The battery module includes: one or a plurality of unit modules; and a module case having an accommodation space therein in which the plurality of unit modules are placed, wherein the unit module includes: a tube-type unit case having a hollow formed therein; a plurality of battery cells configured in a can-type secondary battery form, located in the hollow of the unit case, disposed side by side along a length direction thereof and electrically connected to each other; and an electrode lead having a positive electrode lead located at one side of the unit module and a negative electrode lead located at the other side of the unit module.

19 Claims, 7 Drawing Sheets

(51) Int. Cl.
  *B60L 50/64* (2019.01)
  *B60L 50/50* (2019.01)

(52) U.S. Cl.
  CPC ........... *H01M 2/10* (2013.01); *H01M 2/1077* (2013.01); *H01M 2/1083* (2013.01); *H01M 2220/20* (2013.01); *Y02T 10/7005* (2013.01)

(56) References Cited

U.S. PATENT DOCUMENTS

| | | | |
|---|---|---|---|
| 2006/0099498 A1 | 5/2006 | Chang | |
| 2013/0118825 A1* | 5/2013 | Kwag | B62M 6/90 180/220 |
| 2016/0118635 A1* | 4/2016 | Keller | H01M 2/1077 429/156 |

FOREIGN PATENT DOCUMENTS

| | | |
|---|---|---|
| JP | S50-69622 U | 6/1975 |
| JP | S51-112028 U | 9/1976 |
| JP | 62-10856 A | 1/1987 |
| JP | S61-93973 U | 6/1987 |
| JP | S63-33558 U | 3/1988 |
| JP | 2000-323109 A | 11/2000 |
| JP | 2001-210295 A | 8/2001 |
| JP | 3170246 U | 9/2011 |
| KR | 10-0874455 B1 | 12/2008 |
| KR | 10-2013-0052919 A | 5/2013 |
| KR | 10-1405728 B1 | 6/2014 |
| KR | 10-2014-0132132 A | 11/2014 |
| KR | 10-2015-0003519 A | 1/2015 |
| WO | WO 2014/134143 A1 | 9/2014 |

OTHER PUBLICATIONS

English translations of the Written Opinion of the International Searching Authority and International Search Report (forms PCT/ISA/237 and PCT/ISA/210), dated Jun. 23, 2017, for International Application No. PCT/KR2017/003081.

* cited by examiner

BATTERY MODULE, AND BATTERY PACK AND VEHICLE COMPRISING SAME

TECHNICAL FIELD

The present disclosure relates to a battery module having a plurality of secondary battery, and a battery pack and a vehicle including the battery module, and more particularly, to a battery module having a new coupling structure, and a battery pack and a vehicle including the battery module.

The present application claims priority to Korean Patent Application No. 10-2016-0075277 filed on Jun. 16, 2016 in the Republic of Korea, the disclosures of which are incorporated herein by reference.

BACKGROUND ART

Secondary batteries are highly applicable to a wide range of products and have electrical characteristics with high energy density. Such secondary batteries are applied not only to portable electronic devices but also to electric vehicles, hybrid vehicles, and electric power storage devices, driven by electric driving sources.

A battery pack applied to an electric vehicle and the like is configured so that a plurality of battery modules, each having a plurality of battery cells, are connected to obtain a high output. Each battery cell may be repeatedly charged and discharged by an electrochemical reaction among components including a positive electrode current collector, a negative electrode current collector, a separator, an active material, an electrolyte and the like.

Meanwhile, along with an increased need for a large capacity structure and utilization as energy storage sources in recent years, there is a growing demand for a multi-module battery pack in which a plurality of battery modules, each having a plurality of secondary batteries connected in series or in parallel, are aggregated.

Meanwhile, if conventional circular secondary batteries are applied in the battery module, when the battery cells are coupled, electrode terminals of the battery cells are welded to bus bars, respectively. In addition, in order to protect the circular secondary batteries, protection plates are separately provided to upper and lower portions of the battery module.

However, in the above configuration of the battery module, bus bars coupled by welding when the battery cells are electrically coupled are separately provided, which results in a complex structure and a complicated battery module manufacturing process. Also, since the bus bars should be provided separately, the material cost is increased.

DISCLOSURE

Technical Problem

The present disclosure is designed to solve the problems of the related art, and therefore the present disclosure is directed to providing a battery module having a simple structure, which ensures easy manufacture, and a battery pack and a vehicle including the battery module.

In addition, the present disclosure is directed to providing a battery module capable of protecting battery cells against external impacts and improving the cooling efficiency of the battery cells, and a battery pack and a vehicle including the battery module.

The present disclosure is not limited thereto, and other objects not mentioned herein may be clearly understood by those skilled in the art from the following description.

Technical Solution

The present disclosure provides a battery module having a plurality of battery cells.

According to an embodiment of the present disclosure, the battery module includes: one or a plurality of unit modules; and a module case having an accommodation space therein in which the plurality of unit modules are placed, wherein the unit module includes: a tube-type unit case having a hollow formed therein; a plurality of battery cells configured in a can-type secondary battery form, located in the hollow of the unit case, disposed side by side along a length direction thereof and electrically connected to each other; and an electrode lead having a positive electrode lead located at one side of the unit module and a negative electrode lead located at the other side of the unit module.

In an embodiment, the unit case and the battery cell may have a cylindrical shape.

In an embodiment, an outer surface of the battery cell may be closely adhered to an inner surface of the hollow of the unit case.

In an embodiment, the battery cells adjacent to each other in the unit case may have electrode terminals in direct contact with each other.

In an embodiment, a plurality of protrusions may be formed at the inside of the unit case to protrude toward a center of the inside of the unit case, and the protrusions adjacent to each other may be spaced apart from each other as much as a length of the battery cell.

In an embodiment, a plurality of grooves may be formed at an outer circumference of the unit case along a circumferential direction.

In an embodiment, the unit case and the module case may be made of aluminum.

In an embodiment, the battery module may further include: a pair of end plates located at both sides of the module case; and a connection member located at a side of the end plate which faces the unit module and electrically connected to the electrode leads of the unit module.

In an embodiment, the module case and the end plate may have a cylindrical shape.

In an embodiment, the connection member may include: a body; and a plurality of coupling grooves formed at an inside of the body.

In an embodiment, the electrode leads of the unit modules may be inserted into the coupling grooves.

In an embodiment, an accommodation groove may be formed at the end plate so that a portion of the module case is inserted therein, and the accommodation groove may have a ring-shaped section.

In an embodiment, the plurality of coupling grooves may be located in the accommodation groove.

In an embodiment, the battery module may further include a connector connected to an external device and coupled to an outer side of the end plate.

The present disclosure may provide a battery pack, comprising the battery module described above.

The present disclosure may provide a vehicle, comprising the battery pack described above.

Advantageous Effects

According to an embodiment of the present disclosure, in the battery module of the present disclosure, the unit module having a plurality of secondary batteries is provided in a cylindrical case, and thus it is possible to simplify the structure of the battery module and improve the energy density of the battery module.

In addition, according to an embodiment of the present disclosure, the unit module, the module case, the end plate and the like of the battery module may be coupled easily, and thus it is possible to improve the efficiency of the battery module assembling process.

Moreover, according to an embodiment of the present disclosure, the battery cells are in direct contact with the unit case, which ensures easy transfer of the heat of the battery cells, and thus it is possible to improve the cooling efficiency of the battery cells.

The effects of the present disclosure are not limited to the above, and effects not mentioned herein may be clearly understood by those skilled in the art from the specification and the accompanying drawings.

BEST MODE

Hereinafter, embodiments of the present disclosure will be described in more detail with reference to the accompanying drawings. The embodiments of the present disclosure may be modified in various ways, and the scope of the present disclosure should not be construed as being limited to the embodiments described below. The embodiments are provided to more fully illustrate the present disclosure to those skilled in the art. Thus, the shapes of the components in the figures may be exaggerated to emphasize a clearer description. In addition, terms and words used in the specification and the claims should not be construed as being limited to ordinary or dictionary meanings, but interpreted based on the meanings and concepts corresponding to technical aspects of the present disclosure on the basis of the principle that the inventor is allowed to define terms appropriately for the best explanation.

Figure 1:
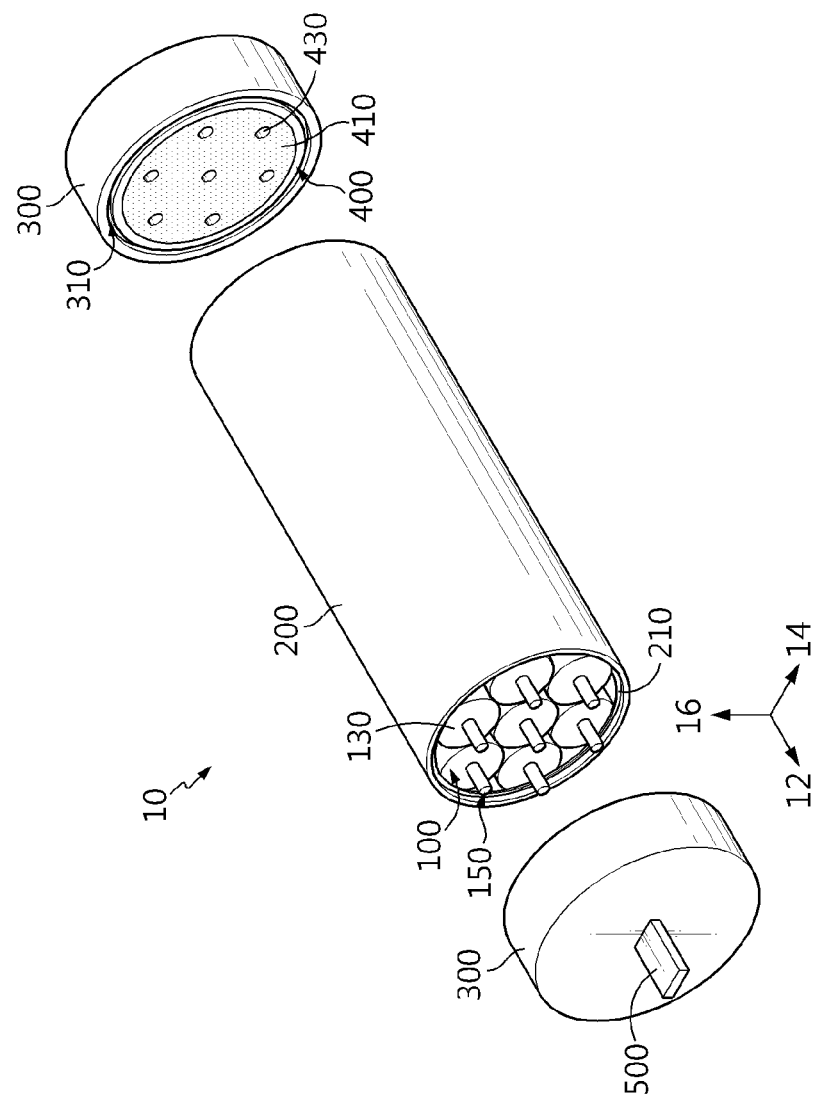
FIG. 1 is an exploded perspective view showing a battery module according to an embodiment of the present disclosure.
Figure 2:
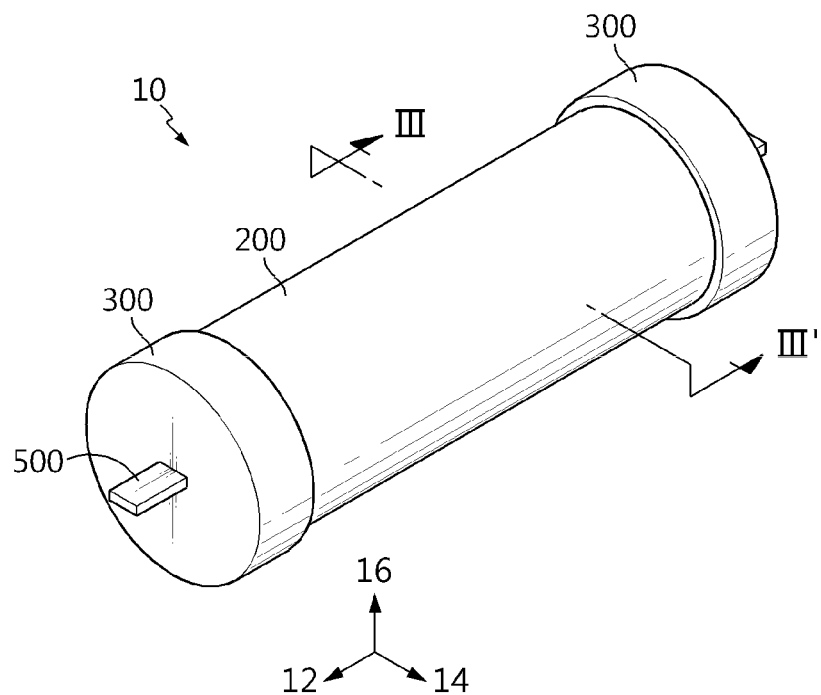
FIG. 2 is a perspective view showing the battery module of FIG. 1, in an assembled state.
Figure 3:
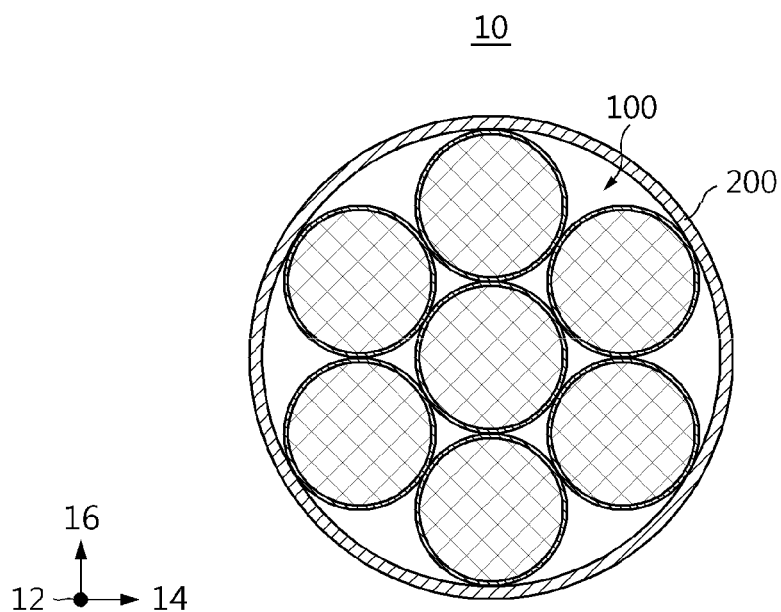
FIG. 3 is a cross-sectional view, taken along the line III-III of FIG. 1.

FIG. 1 is an exploded perspective view showing a battery module according to an embodiment of the present disclosure, FIG. 2 is a perspective view showing the battery module of FIG. 1, in an assembled state, and FIG. 3 is a cross-sectional view, taken along the line III-III of FIG. 1.

Referring to FIGS. 1 to 3, the battery module 10 may include one or a plurality of unit modules 100, the unit module 100 having a plurality of battery cells 110. The battery cell 110 may be a secondary battery. For example, the battery cell 110 may be a can-type secondary battery with a cylindrical shape. Hereinafter, the present disclosure will be described based on the case where the battery cell 110 is a can-type secondary battery with a cylindrical shape.

The battery module 10 includes a unit module 100, a module case 200, an end plate 300, a connection member 400 and a connector 500.

The end plate 300 is provided in a pair, and the end plate 300, the module case 200 and the end plate 300 are disposed side by side in order along a first direction 12. Here, a direction in which the end plate 300, the module case and the end plate 300 are arranged side by side is referred to as the first direction 12. When being observed from the above, a direction perpendicular to the first direction 12 is referred to as a second direction 14. A direction perpendicular to both the first direction 12 and the second direction 14 is referred to as a third direction 16.

Figure 4:
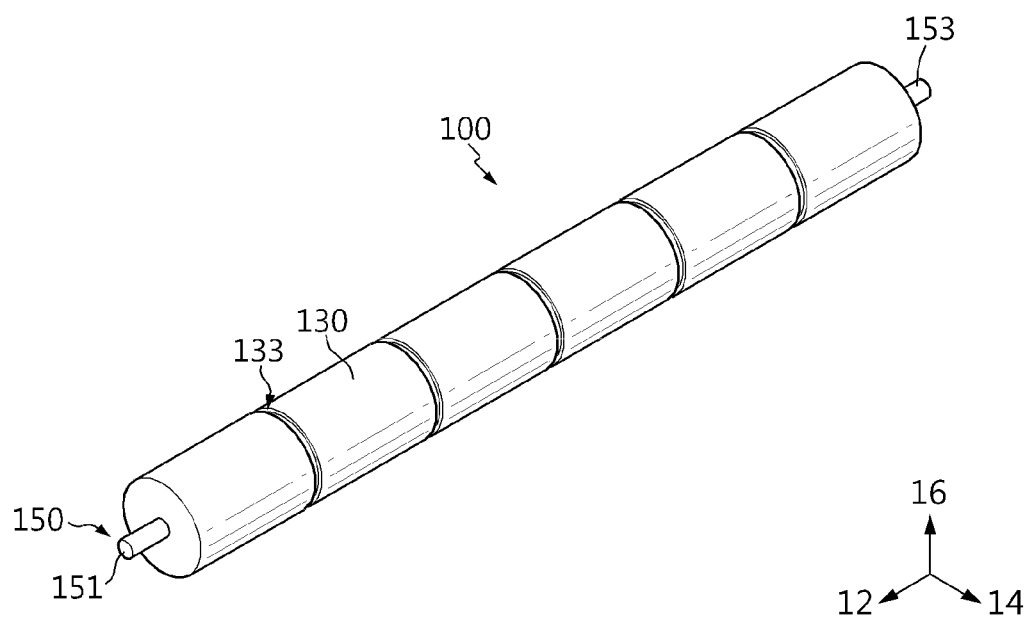
FIG. 4 is a perspective view showing the unit module of FIG. 1.
Figure 5:
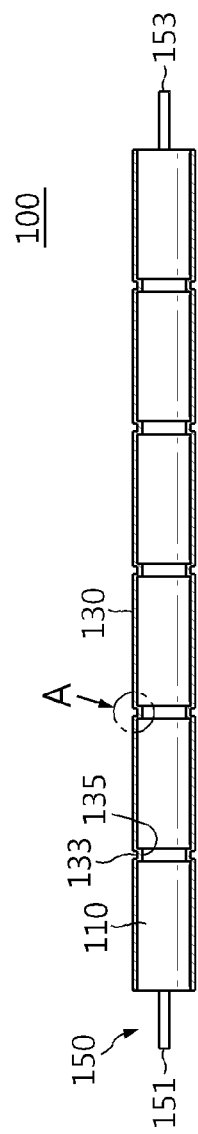
FIG. 5 is a cross-sectional view showing the unit module of FIG. 4.

FIG. 4 is a perspective view showing the unit module of FIG. 1, and FIG. 5 is a cross-sectional view showing the unit module of FIG. 4.

Referring to FIGS. 4 and 5, the unit module 100 includes a plurality of secondary batteries. The embodiment of the present disclosure is explained based on the case where the unit module 100 has six can-type secondary batteries. However, the number of secondary batteries included in the unit module 100 is not limited thereto.

The unit module 100 may be provided in plural. The embodiment of the present disclosure is explained based on the case where seven unit modules 100 are provided, but the number of the unit modules 100 is not limited thereto. The plurality of unit modules 100 may be located at an inside of the module case 200, explained later.

The unit module 100 includes a battery cell 110, a unit case 130 and an electrode lead 150.

The battery cell 110 may be a can-type secondary battery. The battery cell 110 may be provided in plural. The plurality of battery cells 110 may be disposed side by side along the first direction 12. The battery cells 110 adjacent to each other may be located so that different electrodes thereof are in contact with each other. The battery cells 110 adjacent to each other may be located sot that different electrodes are in direct contact with each other. In the present disclosure, an electrode of the battery cell 110 is in direct contact with a different electrode of another battery cell, and thus there is no need of a separate electric connection.

Figure 7:
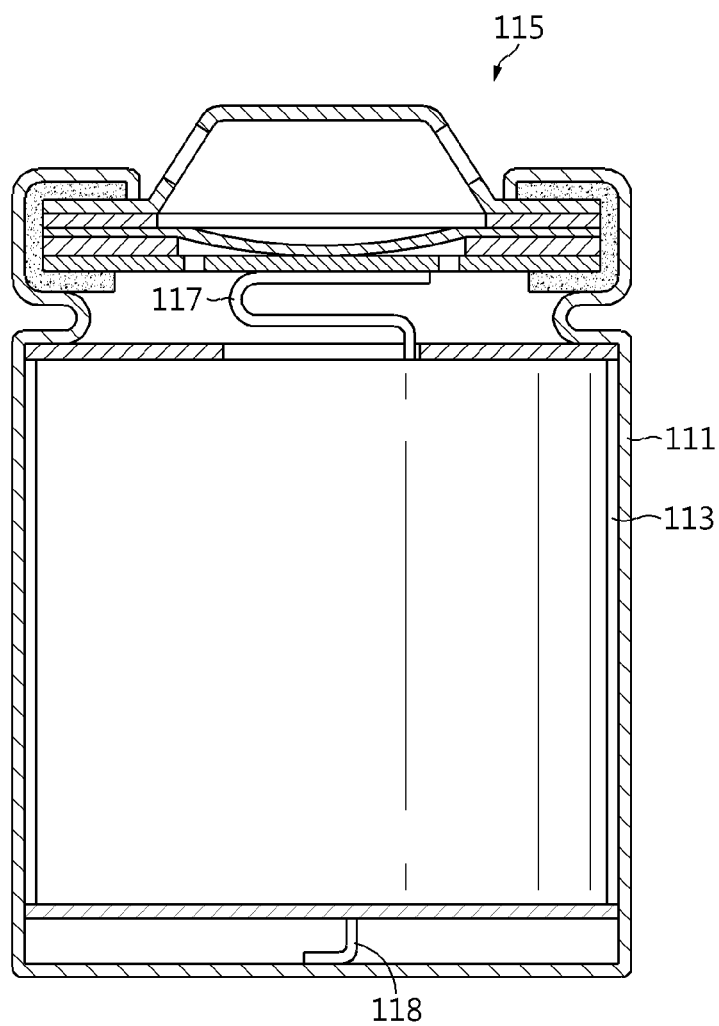
FIG. 7 is a cross-sectional view showing the battery cell.

FIG. 7 is a cross-sectional view showing the battery cell. Referring to FIG. 7, the battery cell 110 includes a cell case 111, an electrode assembly 113, a cap assembly 115, a positive electrode tab 117 and a negative electrode tab 118.

The cell case 111 may have an inner space in which the electrode assembly 113 and the electrolyte are accommodated. The cell case 111 may have an open top. The cell case 111 may have a cylindrical shape. The cell case 111 may made of metal. For example, the cell case 111 may be made of a lightweight conductive metal such as aluminum, stainless steel, or an alloy thereof.

The electrode assembly 113 may be located at the inner space of the cell case 111. The electrode assembly 113 may have a rolled structure in a jelly-roll form in a state where a separator is interposed between the positive electrode plate and the negative electrode plate. A positive electrode tab 117, explained later, may be attached to the positive electrode plate. A negative electrode tab 118 may be attached to the negative electrode plate.

The cap assembly 115 may be located at a top of the electrode assembly 113. The cap assembly 115 may be coupled to an open portion of the cell case 111. The cap assembly 115 may seal the inner space of the cell case 111. The cap assembly 115 may plays a role of a current path for outputting the current generated at the electrode assembly 113 to the outside. The cap assembly 115 may be in contact with the positive electrode tab 117. An upper portion of the cap assembly 115 may serve as a positive electrode terminal.

One end of the positive electrode tab 117 may be in contact with the positive electrode plate of the electrode assembly 113, and the other end thereof may be in contact with the cap assembly 115. The positive electrode tab 117 may be attached to the top of the electrode assembly 113 and electrically connected to the cap assembly 115 serving as a positive electrode terminal.

One end of the negative electrode tab 118 may be in contact with the negative electrode plate of the electrode assembly 113, and the other end thereof may be in contact with a lower end of the cell case 111. The negative electrode tab 118 may be attached to a lower end of the electrode assembly 113 and connected to a bottom of the cell case 111 serving as a negative electrode terminal.

Referring to FIGS. 4 and 5 again, the unit case 130 has an empty space therein. The unit case 130 may have a tube shape with a hollow therein. In the empty space, the plurality of battery cells 110 may be located side by side along the first direction 12. The unit case 130 may have a cylindrical shape. The unit case 130 may be made of metal. For example, the unit case 130 may be made of aluminum. As an alternative, the unit case 130 may be made of a lightweight conductive metal such as stainless steel or an alloy thereof. If the unit case 130 is made of metal, it is possible to protect the battery cell 110 against external impacts.

In addition, the unit case 130 may be made of a metal material with excellent thermal conductivity. The battery cells 110 in the unit case 130 may be in direct contact with an inner surface of the unit case 130. Thus, if the unit case 130 is made of a metal material with excellent thermal conductivity, the heat generated at the battery cells 110 may be emitted to the outside, thereby improving the cooling efficiency of the battery cells 110. In addition, the unit case 130 may also be made of rubber, different to the above.

Figure 6:
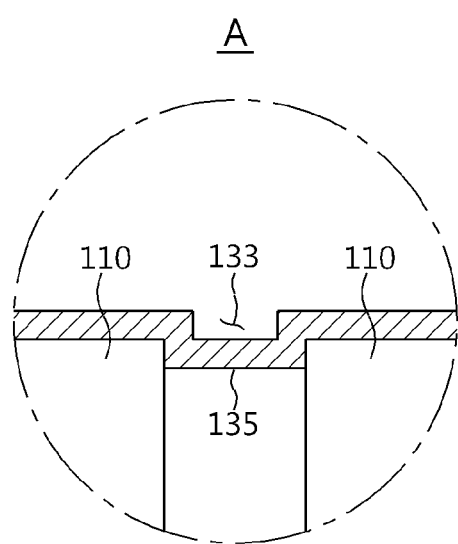
FIG. 6 is an enlarged view showing a portion A of FIG. 5.

FIG. 6 is an enlarged view showing a portion A of FIG. 5. Referring to FIGS. 4 to 6, a groove 133 may be formed at an outer surface of the unit case 130. The groove 133 may be formed at an outer circumference of the unit case 130 along a circumferential direction. The groove 133 may be provided in plural. The plurality of grooves 133 may be spaced apart from each other by a predetermined distance in the first direction 12.

A plurality of protrusions 135 may be formed at the inside of the unit case 130. The battery cell 110 may be fixed to the protrusion 135. The protrusion 135 may protrude toward a center of the inside of the unit case 130. The protrusions 135 may be spaced apart from each other by a predetermined distance in the first direction 12. The protrusions 135 adjacent to each other may be spaced apart from each other as much as a length of the battery cell 110. The protrusion 135 may be formed in the unit case 130 to fix the battery cell 110 and also prevent the battery cells 110 from colliding with each other and thus being damaged at the inside of the unit case 130.

In the unit case 130, the outer surface of the battery cells 110 may be closely adhered to an inner surface of the hollow of the unit case 130. In other words, the outer surface of the battery cells 110 may be in direct contact with the inner surface of the unit case 130. Since the battery cells 110 are in direct contact with the inner surface of the unit case 130, the heat of the battery cell 110 may be transferred to the unit case 130. If the unit case 130 is made of aluminum with excellent thermal conductivity, the heat received from the battery cells 110 may be emitted to the outside, thereby improving the cooling efficiency of the battery cell 110. In addition, the battery cells 110 adjacent to each other in the unit case 130 may be positioned so that their electrode terminals are in direct contact with each other.

The electrode lead 150 includes a positive electrode lead 151 and a negative electrode lead 153. The positive electrode lead 151 may be located at one side of the unit module 100. One end of the positive electrode lead 151 may be exposed out of the unit case 130. The other end of the positive electrode lead 151 may be electrically connected to the battery cell 110 at the inside of the unit case.

One end of the negative electrode lead 153 may be exposed out of the unit case 130. The other end of the negative electrode lead 153 may be electrically connected to the battery cell 110 at the inside of the unit case.

Referring to FIGS. 1 to 3, the module case 200 may have an empty space therein. The module case 200 may have a tube shape with a hollow. The module case 200 may have a cylindrical shape. The plurality of unit modules 100 may be located at the inner space of the module case 200. The module case 200 may be made of metal. For example, the module case 200 may be made of aluminum. If the module case 200 is made of aluminum, it is possible to protect the unit module 100 against external impacts. In addition, the heat generated at the battery cell 110 may be received from the unit module 100 at the module case 200 and emit the heat to the outside, thereby enhancing the cooling effect. Both sides of the module case 200 in the first direction 12 may be opened.

A hooking protrusion 210 may be provided at the inside of the module case 200. The hooking protrusion 210 may be provided in a pair at both side ends of the module case 200 in the first direction 12. The hooking protrusion 210 may protrude toward the center of the inside of the module case 200. The hooking protrusion 210 may have a ring shape. One end of the hooking protrusion 210 may be in contact with a portion of the unit module 100 to prevent the unit module 100 from being deviated out of the module case 200. In addition, the hooking protrusion 210 may enhance the coupling force between the module case 200 and the end plate 300.

Figure 8:
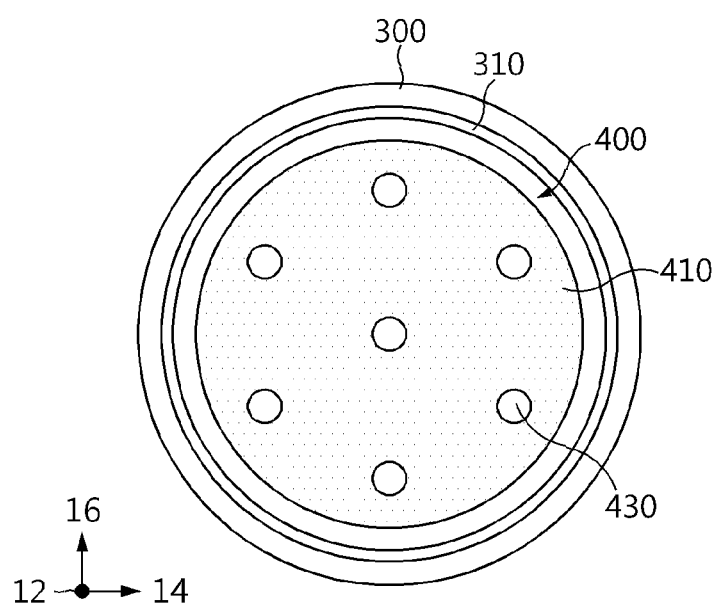
FIG. 8 is a front view showing the end plate of FIG. 1.

FIG. 8 is a front view showing the end plate of FIG. 1. Referring to FIGS. 1 to 3 and 8, the end plate 300 may be provided in a pair. The pair of end plates 300 may be coupled to both side surfaces of the module case 200 in the first direction 12. The end plate 300 may have a cylindrical shape. The connector 500, explained later, may be coupled to one side of the end plate 300, and the connection member 400 may be located at the other side thereof.

The end plate 300 may have an accommodation groove 310 formed therein. A portion of the module case 200 may be inserted into the accommodation groove 310. The accommodation groove 310 may have a section with a ring shape. The accommodation groove 310 may be formed at a surface of the end plate 300 which faces the module case 200. The module case 200 may be partially inserted into the accommodation groove 310 so that the end plate 300 and the module case 200 are coupled. By using the accommodation groove 310 formed at the end plate 300, the coupling force between the end plate 300 and the module case 200 may be enhanced. Different from the above, the end plate 300 and the module case 200 may also be coupled in various coupling methods such as welding, bolting or the like.

The connection member 400 may be electrically connected to the electrode leads 150 of the unit module 100. The connection member 400 may be located at the end plate 300. The connection member 400 may be electrically connected to the electrode leads 150 of the unit module 100.

The connection member 400 includes a body 410 and a coupling groove 430. The body 410 may have a circular section.

The coupling groove 430 may be formed at the inside of the body 410. The coupling groove 430 may be provided in plural. The plurality of coupling grooves 430 may be provided in a number corresponding to the number of the unit modules 100. The plurality of coupling grooves 430 may be located in the accommodation groove 310. The electrode lead 150 of the unit module 100 may be coupled to the coupling groove 430. For example, the positive electrode lead 151 of the electrode lead 150 of the unit module 100 may be inserted. The coupling groove 430 may be shaped corresponding to the electrode lead 150.

The connector 500 may connect the battery module 10 to an external device. The connector 500 may be coupled to an outer side of the end plate. The connector 500 may be provided to the pair of end plates 300, respectively.

Though not shown in the figure, the battery module 10 may further include a sensing member. The sensing member may sense voltages of the unit modules 100 and transmit the sensing information to the outside.

The embodiment of the present disclosure has been explained based on the case where the unit case 130 and the module case 200 of the unit module 100 have a cylindrical shape, but the case shape is not limited thereto and may have various shapes such as a rectangular shape, a polygonal shape or the like.

In the present disclosure, the battery module 10 having a new configuration, which has not been proposed before, is provided, and the battery module 10 includes the cylindrical unit module 100 and the cylindrical module case 200 housing the plurality of unit modules 100. In the embodiment of the present disclosure, the battery module 10 has a simple structure which needs a simple manufacturing process, and the plurality of battery cells 110 may be densely provided at the inside of the unit module 100 to improve the energy density of the battery module 10. In addition, the battery cells 110 at the inside of the unit module 100 may be easily electrically contacted and connected. Moreover, the electrode leads 150 may be coupled to the coupling groove 430 of the connection member 400 to allow easy electric connection of the unit module 100. In addition, by coupling the end plate 300 and the module case 200, it is possible to enhance the coupling force among components.

The battery pack according to the present disclosure may include at least one battery module 10 described above. In addition to the battery module 10, the battery pack may further include a pack case for accommodating the battery module 10, and various devices for controlling charge/discharge of the battery module 10. For example, a battery management system (BMS), a current sensor, a fuse, and the like may be further included.

The battery module 10 according to the present disclosure may be applied to vehicles such as electric vehicles and hybrid vehicles. The vehicle according to the present disclosure may include at least one battery pack including the battery module 10 according to the embodiment in the present disclosure.

The above description is illustrative of the present disclosure. Also, the above disclosure is intended to illustrate and explain the preferred embodiments of the present disclosure, and the present disclosure may be used in various other combinations, modifications, and environments. In other words, the present disclosure may be changed or modified within the scope of the concept of the invention disclosed herein, within the equivalent scope of the disclosure, and/or within the skill and knowledge of the art. The described embodiments illustrate the best state of the art to implement the technical idea of the present disclosure, and various changes may be made thereto as being demanded for specific applications and uses of the present disclosure. Accordingly, the above description is not intended to limit the present disclosure to the embodiments. Also, the appended claims should be construed as encompassing such other embodiments.

What is claimed is:

1. A battery module, comprising:
a plurality of unit modules; and
a module case having an accommodation space therein in which the plurality of unit modules are placed,
wherein each of the unit module includes:
a tube-type unit case having a hollow formed therein;
a plurality of battery cells configured in a can-type secondary battery form located in the hollow of the unit case, disposed side by side along a length direction thereof and electrically connected to each other, each battery cell having a housing; and
an electrode lead having a positive electrode lead located at one side of the unit module and a negative electrode lead located at the other side of the unit module.

2. The battery module according to claim 1, wherein the unit case and the battery cell have a cylindrical shape.

3. The battery module according to claim 1, wherein an outer surface of the battery cell is closely adhered to an inner surface of the hollow of the unit case.

4. The battery module according to claim 1, wherein the battery cells adjacent to each other in the unit case have electrode terminals in direct contact with each other.

5. The battery module according to claim 4, wherein a plurality of protrusions are formed at the inside of the unit case to protrude toward a center of the inside of the unit case, and the protrusions adjacent to each other are spaced apart from each other as much as a length of the battery cell.

6. The battery module according to claim 1, wherein a plurality of grooves are formed at an outer circumference of the unit case along a circumferential direction.

7. The battery module according to claim 1, wherein the unit case and the module case are made of aluminum.

8. The battery module according to claim 1, further comprising:
a pair of end plates located at both sides of the module case; and
a connection member located at a side of the end plate which faces the unit module and electrically connected to the electrode leads of the unit module.

9. The battery module according to claim 8, wherein the module case and the end plate have a cylindrical shape.

10. A battery module, comprising:
one or a plurality of unit modules; and
a module case having an accommodation space therein in which the plurality of unit modules are placed,
wherein the unit module includes:
a tube-type unit case having a hollow formed therein;
a plurality of battery cells configured in a can-type secondary battery form, located in the hollow of the unit case, disposed side by side along a length direction thereof and electrically connected to each other;
an electrode lead having a positive electrode lead located at one side of the unit module and a negative electrode lead located at the other side of the unit module;
a pair of end plates located at both sides of the module case; and a connection member located at a side of the end plate which faces the unit module and electrically connected to the electrode leads of the unit module,
wherein the connection member includes:
a body; and
a plurality of coupling grooves formed at an inside of the body.

11. The battery module according to claim 10, wherein the electrode leads of the unit modules are inserted into the coupling grooves.

12. The battery module according to claim 10, wherein an accommodation groove is formed at the end plate so that a portion of the module case is inserted therein, and the accommodation groove has a ring-shaped section.

13. The battery module according to claim 12, wherein the plurality of coupling grooves are located in the accommodation groove.

14. A battery pack, comprising a battery module defined in claim 1.

15. A vehicle, comprising a battery pack defined in claim 14.

16. The battery module according to claim 1, wherein each of the plurality of unit modules is separately insertable and removable from the module case.

17. The battery module according to claim 1, further comprising a pair of end plates located at both sides of the module case, each end plate having a body and a coupling groove surrounding the body,
wherein the module case is retained in the coupling groove.

18. The battery module according to claim 17, further comprising a hooking protrusion extending radially inwards at each end of the module case.

19. The battery module according to claim 1, wherein each of the battery cells includes an electrode terminal, and
wherein the positive electrode lead extends from a top of the unit case and the negative electrode lead extends from a bottom of the unit case.

* * * * *